(12) United States Patent
Xiong et al.

(10) Patent No.: US 10,220,509 B2
(45) Date of Patent: Mar. 5, 2019

(54) ANTI-SHAKE METHOD OF ROBOT AND ROBOT THEREOF

(71) Applicant: UBTECH Robotics Corp, Shenzhen (CN)

(72) Inventors: Youjun Xiong, Shenzhen (CN); Gaobo Huang, Shenzhen (CN); Wenxue Xie, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 15/815,583

(22) Filed: Nov. 16, 2017

(65) Prior Publication Data
US 2018/0361573 A1 Dec. 20, 2018

(30) Foreign Application Priority Data
Jun. 19, 2017 (CN) .......................... 2017 1 0464448

(51) Int. Cl.
| G05B 5/01 | (2006.01) |
| B25J 9/12 | (2006.01) |
| H02P 23/04 | (2006.01) |
| G05D 19/02 | (2006.01) |
| G05D 3/20 | (2006.01) |

(52) U.S. Cl.
CPC .................. *B25J 9/12* (2013.01); *G05B 5/01* (2013.01); *G05D 3/20* (2013.01); *G05D 19/02* (2013.01); *H02P 23/04* (2013.01)

(58) Field of Classification Search
CPC ..................................... B25J 9/12; G05B 5/01
USPC ......................................................... 318/624
See application file for complete search history.

(56) References Cited

U.S. PATENT DOCUMENTS

| 2015/0165620 A1* | 6/2015 | Osaka | ..................... B25J 13/088 700/250 |
| 2016/0114483 A1* | 4/2016 | Ishikawa | ................ B25J 9/1641 700/254 |
| 2017/0015004 A1* | 1/2017 | Osaka | ..................... B25J 13/088 |
| 2017/0327165 A1* | 11/2017 | Yamaguchi | ........... B62D 57/032 |
| 2017/0361464 A1* | 12/2017 | Sasaki | .................... B25J 9/1641 |

* cited by examiner

*Primary Examiner* — Erick D Glass

(57) ABSTRACT

The present disclosure relates to an anti-shake method of robot and a robot thereof. The method includes: receiving at least one motion-controlling instruction from a main control unit, determining whether a servo performs the motion-controlling instruction, obtaining a target angle and a current angle of the servo upon determining the servo is not under a control of a main control unit, determining whether the target angle and the current angle is within a fault tolerance range, terminating the servo upon determining the target angle and the current angle is within the fault tolerance range. As such, the shaking of the robot may be avoided when the robot performs actions, so as to reduce power consuming and to extend stand-by time.

6 Claims, 5 Drawing Sheets

ANTI-SHAKE METHOD OF ROBOT AND ROBOT THEREOF

CROSS REFERENCE TO RELATED APPLICATIONS

This application claims priority to Chinese Patent Application No. 201710464448.2, filed Jun. 19, 2017, which is hereby incorporated by reference herein in its entirety.

BACKGROUND

1. Technical Field

The present disclosure relates to a motion-controlled field, and more particularly to an anti-shake method of robots and a robot thereof.

2. Description of Related Art

Robot is a mechanical product including components, such as limbs, joints, and intelligent control panels. Each of the joints may rotate to different angles according to corresponding instructions for controlling the components. As such, the components, such as, the limbs, the arm, and the leg, may move accordingly.

In one example, when the servo of the limb of the robot moves to a certain position and stays at the certain position, the servo has to provide particular current to maintain the servo of the limb to stay still at the position. If any change exists with respect to the current or the voltage, the servo may continuously adjust the robot, which results in shaking limbs.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments. It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . ." does not exclude the presence of additional identical elements in the process, method, article or device that comprises the said element.

Figure 1:
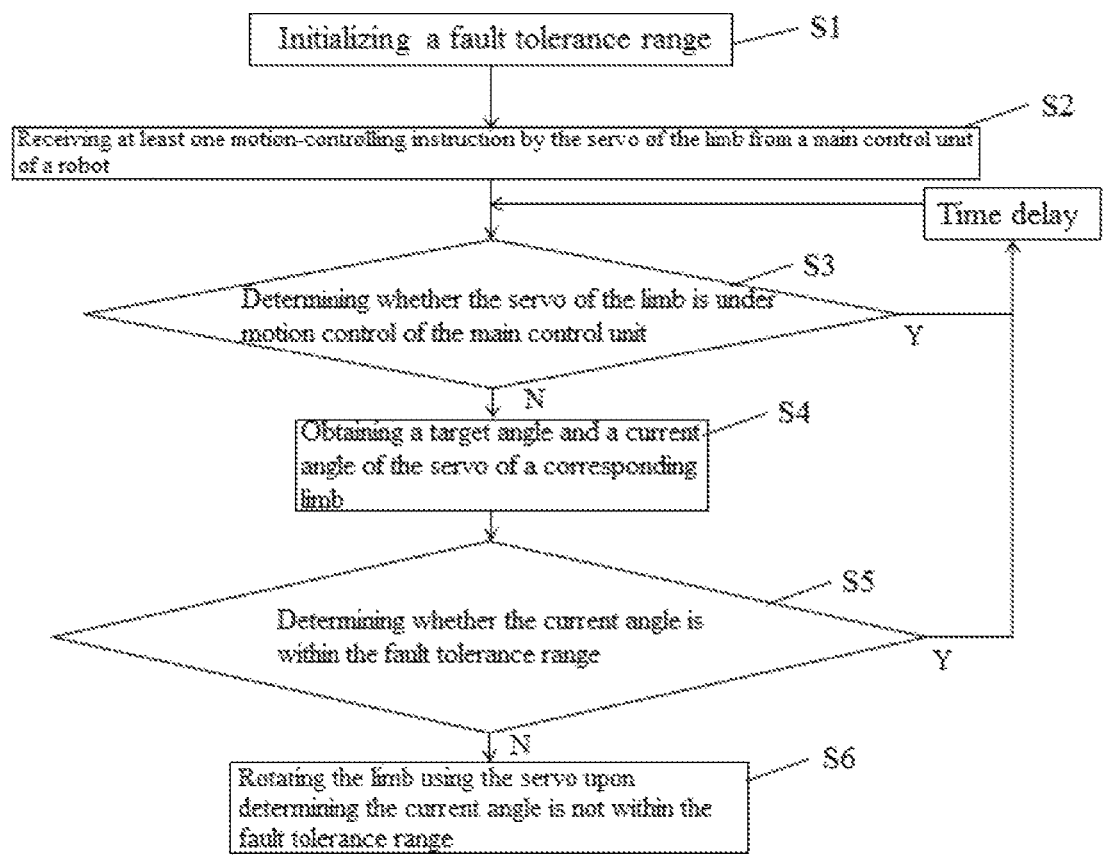
FIG. 1 is a flowchart illustrating an anti-shake method of a robot in accordance with one embodiment of the present disclosure.
Figure 1A:
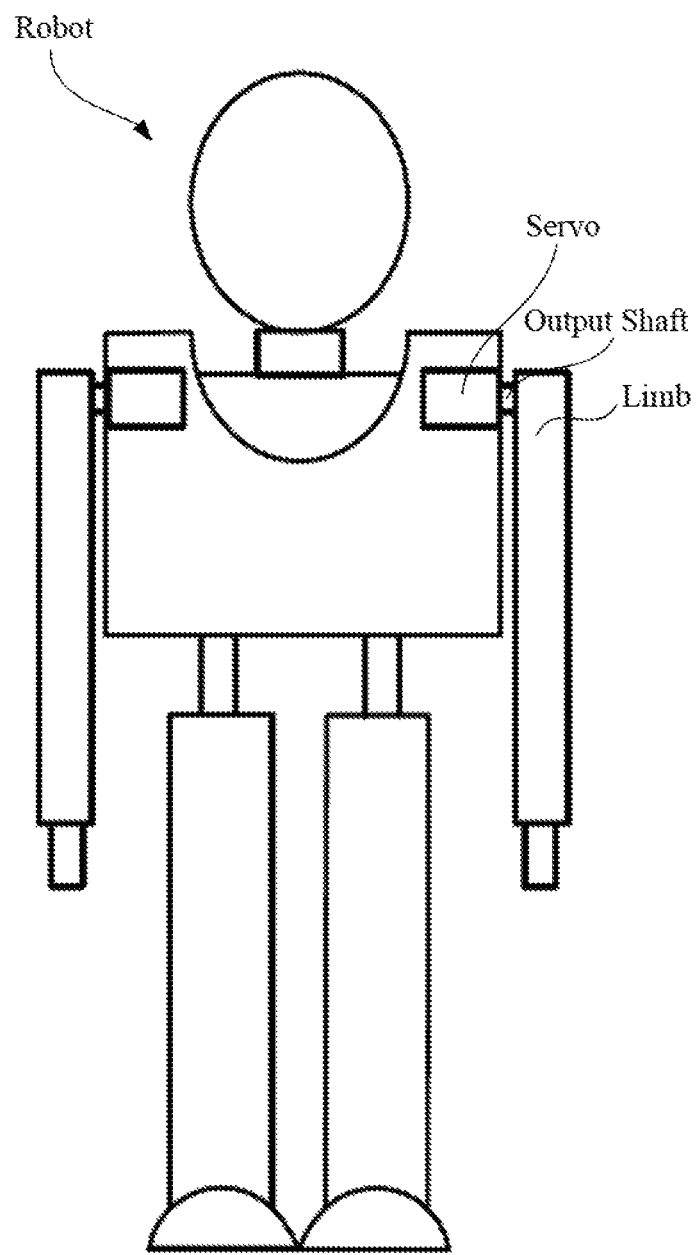
FIG. 1A is a schematic view of one embodiment of a structure of the robot in accordance with the embodiment of FIG. 1.

FIG. 1 is a flowchart illustrating an anti-shake method of a robot (see FIG. 1A) in accordance with one embodiment of the present disclosure. In one example, each of the servos corresponding to each of the limbs is configured with a fault tolerance range regarding angles of movement of the limbs.

In step S1: initializing a fault tolerance range.

Figure 1B:
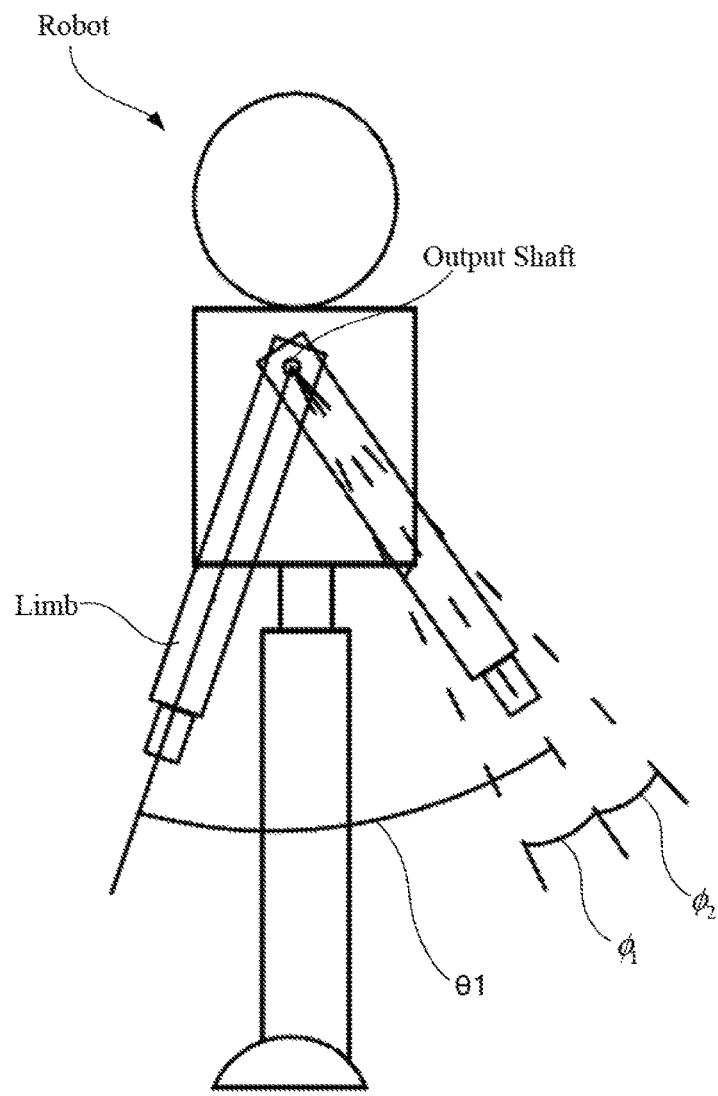
FIG. 1B is a schematic view of a rotational angle in accordance with the embodiment of FIG. 1.

When a control system is activated, the fault tolerance range of the system is preset as follows. The fault tolerance range may be between a target start angle and a target end angle. The target start angle is a target angle ($\theta_1$) (see FIG. 1B) minus a first angle ($\phi_1$), and the target end angle is obtained by summing the target angle ($\theta_1$) and a second angle ($\phi_2$). The first angle ($\phi_1$) may equal to the second angle ($\phi_2$), while the first angle ($\phi_1$) and the second angle ($\phi_2$) may not be zero degrees simultaneously. Specifically, the first angle ($\phi_1$) and the second angle ($\phi_2$) may be preset and stored in the robot in advance.

In step S2: receiving at least one motion-controlling instruction by the servo of the limb from a main control unit of a robot.

After initializing the fault tolerance range, the servo of the limb may receive and execute the motion-controlling instruction transmitted from the main control unit. Specifically, the motion-controlling instructions may be instructions driving the servo to rotate accordingly, such as to rotate to different target angles with different speeds, or to stop rotating. The limb moves (e.g., rotates) with the rotation of the servo.

In step S3: determining whether the servo of the limb is under motion control of the main control unit. The servo of the limb being under motion control of the main control unit is defined to be, for example, the servo corresponding to the motion-controlling instruction transmitted from the main control unit which represents "rotating from 30 degrees to 60 degrees within 0.5 seconds."

Specifically, when the servo of the limb is under the control of the main control unit, it is not necessary to perform a fault tolerance range process. For example, if the motion-controlling instruction transmitted from the main control unit is "rotating from 30 degrees to 60 degrees within 0.5 seconds", the fault tolerance range process may not be performed within during the 0.5 second.

In step S4: obtaining a target angle and a current angle of the servo of a corresponding limb. The current angle is, for example, an angle of the rotation of the servo which has already been performed. The target angle is, for example, an angle of the rotation of the servo which is to be performed.

If the servo is not under the control of the main control unit, the target angle ($\theta_1$) and the current angle ($\theta_2$) driving the servo of the limb may be obtained. If the servo is under the control of the main control unit, the process goes back to step S3 to determine a state of the servo.

In step S5: determining whether the current angle is within the fault tolerance range.

Figure 2:
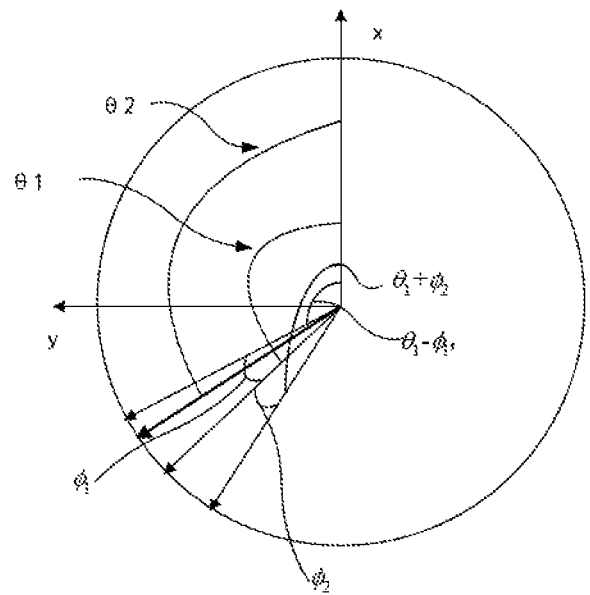
FIG. 2 is a schematic view of a fault tolerance range in accordance with one embodiment of the present disclosure.

FIG. 2 is a schematic view of the fault tolerance range in accordance with one embodiment of the present disclosure.

Referring to FIG. 2, the system may configure the target angle ($\theta_1$) and obtain the current angle ($\theta_2$). The fault tolerance range is between the target start angle and the target end angle. The target start angle is the target angle ($\theta_1$) minus the first angle ($\phi_1$) and the target end angle is obtained by summing the target angle ($\theta_1$) and the second angle ($\phi_2$), i.e., [$\theta_1-\phi_1$, $\theta_1+\phi_2$]. In one example, the first angle ($\phi_1$) may be the second angle ($\phi_2$), while the first angle ($\phi_1$) and the second angle ($\phi_2$) may not be zero degrees simultaneously. In another example, the first angle ($\phi_1$) may be greater than or less than the second angle ($\phi_2$).

Figure 3:
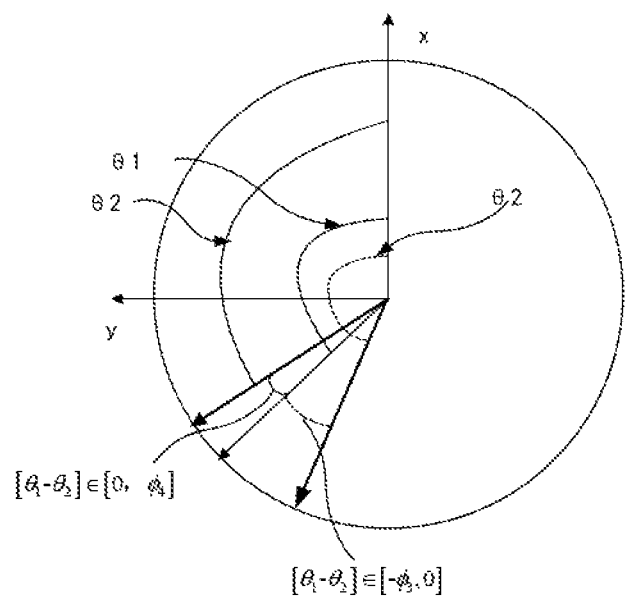
FIG. 3 is a schematic view of the fault tolerance range in accordance with another embodiment of the present disclosure.

Referring to FIG. 3, in one example, the fault tolerance range may include a third angle ($\phi_3$) and a fourth angle ($\phi_4$). The third angle ($\phi_3$) may be equal to, greater than, or less than the fourth angle ($\phi_4$), while the third angle ($\phi_3$) and the fourth angle ($\phi_4$) may not be zero degrees simultaneously. When the current angle ($\theta_2$) is greater than the target angle ($\theta_1$), it is determined whether a difference between the target angle ($\theta_1$) and the current angle ($\theta_2$) is within the fault tolerance range. The determining process may further include the following steps.

1) When the current angle ($\theta_2$) is greater than the target angle ($\theta_1$).

It is determined whether the difference between the current angle ($\theta_2$) and the target angle ($\theta_1$), i.e., [$\theta_1-\theta_2$], is within the fault tolerance range ranging from the third angle ($\phi_3$) to zero degrees, i.e., [$-\phi_3$, 0].

2) When the current angle ($\theta_2$) is less than the target angle ($\theta_1$).

It is determined whether the difference between the current angle ($\theta_2$) and the target angle ($\theta_1$), i.e., [$\theta_1-\theta_2$], is within the fault tolerance range ranging from zero degrees to the fourth angle ($\phi_4$), i.e., [0, $\phi_4$].

In step S6: rotating the limb using the servo upon determining the current angle is not within the fault tolerance range.

If the current angle is within the fault tolerance range [$\theta_1-\phi_1$, $\theta_1+\phi_2$], or the difference between the target angle ($\theta_1$) and the current angle ($\theta_2$), i.e., [$\theta_1-\theta_2$], is within the fault tolerance range ranging from the third angle ($\phi_3$) to zero degrees, i.e., [$-\phi_3$, 0] when the current angle ($\theta_2$) is greater than the target angle ($\theta_1$), or the difference between the target angle ($\theta_1$) and the current angle ($\theta_2$), i.e., [$\theta_1-\theta_2$], is within the fault tolerance range ranging from zero degrees to the fourth angle ($\phi_4$), i.e., [0, $\phi_4$], the servo has no need to be rotated. As such, the servo of the limb is configured to be under the motion control of the main control unit and without shaking, and the process goes to the step S3 to determine the state of the servo.

If the current angle is not in the fault tolerance range [$\theta_1-\phi_1$, $\theta_1+\phi_2$], or the difference between the target angle ($\theta_1$) and the current angle ($\theta_2$), i.e., [$\theta_1-\theta_2$], is not in the fault tolerance range ranging from the third angle ($\phi_3$) to zero degrees, i.e., [$-\phi_3$, 0] when the current angle ($\theta_2$) is greater than the target angle ($\theta_1$), or the difference between the target angle ($\theta_1$) and the current angle ($\theta_2$), i.e., [$\theta_1-\theta_2$], is not in the fault tolerance range ranging from zero degrees to the fourth angle ($\phi_4$), i.e., [0, $\phi_4$], the servo may be driven to rotate to the target angle ($\theta_1$). Or the servo may rotate the current angle to the fault tolerance range [$\theta_1-\phi_1$, $\theta_1+\phi_2$], or to satisfy the difference between the target angle ($\theta_1$) and the current angle ($\theta_2$) being within the range [$-\phi_3$, 0] or [0, $\phi_4$].

Wherein the step S1 and the step S2 may be omitted in the present disclosure.

In view of the above, the fault tolerance range is set in each of the servos corresponding to the limbs. It is determined whether the angle of servo is within the fault tolerance range when the servo of the limb is not under the control of the main control unit. Such that the shaking of the robot may be avoided when the robot performs actions, so as to reduce power consuming and to extend stand-by time.

Figure 4:
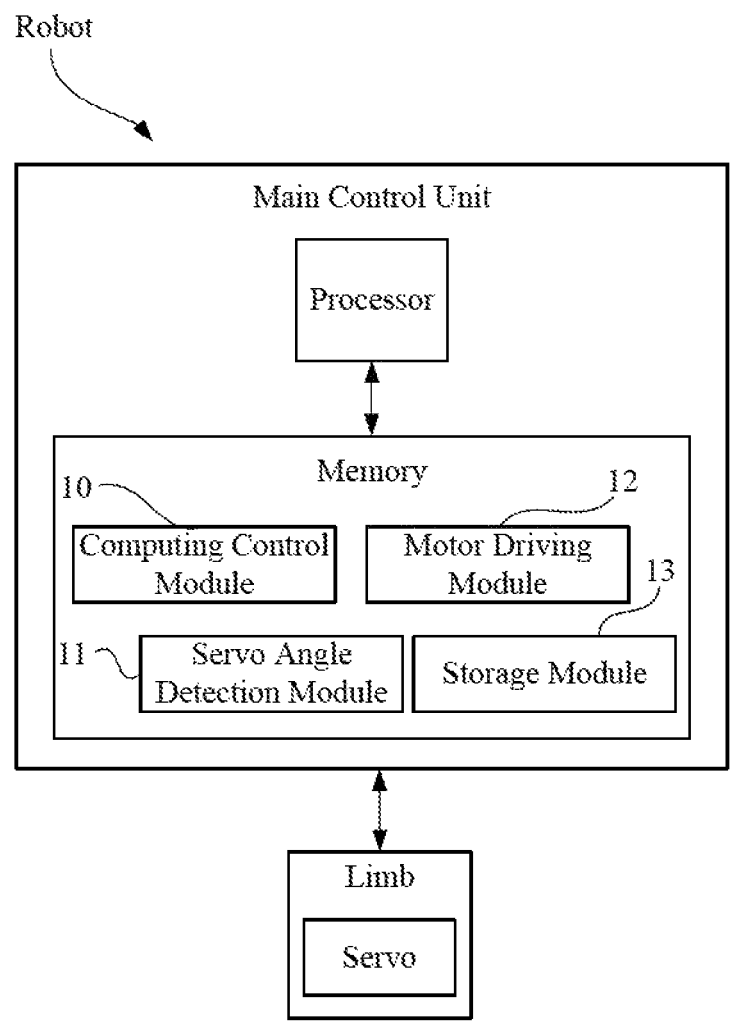
FIG. 4 is a schematic view of a robot in accordance with one embodiment of the present disclosure.

Referring to FIG. 4, the present disclosure further relates to the robot, including: one or more processors, a memory, and one or more programs including a computing control module 10, a servo angle detection module 11, a motor driving module 12, and a storage module 13. The one or more programs are stored in the memory and configured to be executed by the one or more processors.

The computing control module 10 is configured to determine whether the servo of the limb is under the control of the main control unit. If the servo of the limb is not under the control of the main control unit, the target angle of the servo may be obtained, and the current angle of the servo may be obtained by the servo angle detection module 11. The computing control module 10 is further configured to determine whether the difference of the current angle and the target angle is within the fault tolerance range. If the difference of the current angle and the target angle is within the fault tolerance range, the computing control module 10 continues to determine whether the servo of the limb is under the control of the main control unit.

If the computing control module 10 determines the difference of the current angle and the target angle is not in the fault tolerance range, the motor driving module 12 may control the servo to rotate the current angle to the fault tolerance range.

The computing control module 10 is configured to control the servo to rotate to the target angle via the motor driving module 12.

The computing control module 10 is further configured to initialize the fault tolerance range of the system. The servo is configured to receive the motion-controlling instruction from the computing control module 10 and to perform the motion-controlling instruction via the motor driving module 12.

The fault tolerance range is between the target start angle and the target end angle. The target start angle is the target angle minus the first angle, and the target end angle is obtained by summing the target angle and the second angle. Wherein the first angle and the second angle may be configured and stored in the storage module 13 in advance. In one example, the first angle may be the second angle, while the first angle and the second angle may not be zero degrees simultaneously. In another example, the first angle may be greater than or less than the second angle. Terminating the servo means to stop rotating the servo.

Each of the modules is configured to conduct each of the steps of the anti-shake method described above.

In view of the above, the fault tolerance range is set in each of the servos of the limbs. It is determined whether the angle of servo is within the fault tolerance range when the servo of the limb is not under the control of the main control unit. Such that the shaking of the robot may be avoided when the robot performs actions, so as to reduce power consuming and to extend stand-by time.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A computer-implemented method of a robot comprising a limb and a servo of the limb, comprising:

receiving a target rotational angle of an output shaft of the servo from a main control unit of the robot, and obtaining a current rotational angle of the output shaft and a preset fault tolerance range, wherein the preset fault tolerance range is a rotational angle of the output shaft between a target start rotational angle of the output shaft to a target end rotational angle of the output shaft;

determining whether the current rotational angle is within the preset fault tolerance range;

maintaining the output shaft of the servo at the current rotational angle and determining whether the servo receives a new target rotational angle in response to the current rotational angle within the fault tolerance range; and rotating the output shaft of the servo to the target rotational angle in response to the current rotational angle being not within the fault tolerance range.

2. The computer-implemented method according to claim 1, wherein
the target start rotational angle is the target rotational angle minus a first rotational angle, and the target end rotational angle is obtained by summing the target rotational angle and a second rotational angle.

3. The computer-implemented method according to claim 2, wherein the first rotational angle is equal to the second angle, and the first rotational angle and the second rotational angle are not zero degrees simultaneously.

4. A robot, comprising:
a limb comprising a servo;
a main control unit;
a processor;
a storage; and
one or more programs, wherein the one or more programs are stored in the storage and configured to be executed by the processor, the one or more programs executing a method, comprising:

receiving a target rotational angle of an output shaft of the servo from the main control unit, and obtaining a current rotational angle of the output shaft and a preset fault tolerance range, wherein the preset fault tolerance range is a rotational angle of the output shaft between a target start rotational angle of the output shaft to a target end rotational angle of the output shaft;

determining whether the current rotational angle is within the preset fault tolerance range;

maintaining the output shaft of the servo at the current rotational angle and determining whether the servo receives a new target rotational angle in response to the current rotational angle being within the fault tolerance range; and rotating the output shaft of the servo to the target rotational angle in response to the current rotational angle being not within the fault tolerance range.

5. The robot according to claim 4, wherein
the target start rotational angle is the target rotational angle minus a first rotational angle, and the target end rotational angle is obtained by summing the target rotational angle and a second rotational angle.

6. The robot according to claim 5, wherein the first rotational angle is equal to the second rotational angle, and the first rotational angle and the second rotational angle are not zero degrees simultaneously.

* * * * *